United States Patent [19]

Ohara

[11] Patent Number: 4,549,190
[45] Date of Patent: Oct. 22, 1985

[54] LIGHT QUANTITY COMPENSATION APPARATUS

[75] Inventor: Yuji Ohara, Kanagawa, Japan

[73] Assignee: Fuji Photo Film Co., Ltd., Kanagawa, Japan

[21] Appl. No.: 550,425

[22] Filed: Nov. 10, 1983

[30] Foreign Application Priority Data

Nov. 10, 1982 [JP] Japan .................. 57-196122

[51] Int. Cl.[4] .............................. G01D 9/42
[52] U.S. Cl. ..................... 346/108; 369/106
[58] Field of Search ............ 346/108, 76 L, 160; 369/106, 116

[56] References Cited
U.S. PATENT DOCUMENTS

| | | | |
|---|---|---|---|
| 3,654,624 | 4/1972 | Becker | 346/76 L |
| 3,787,887 | 1/1974 | Burton | 346/108 |
| 4,162,398 | 7/1979 | Kayanuma | 369/106 |
| 4,221,960 | 9/1980 | Maeda | 369/116 |

OTHER PUBLICATIONS

*Microelectronics*, Millman, 1979, pp. 523–527, McGraw Hill.

*Primary Examiner*—E. A. Goldberg
*Assistant Examiner*—M. Reinhart
*Attorney, Agent, or Firm*—Sughrue, Mion, Zinn, Macpeak & Seas

[57] ABSTRACT

Apparatus for compensating for a quantity of light includes an acoustooptic modulator which modulates light incident thereon in response to a first signal to produce output light. A photoelectric converter is provided for detecting a level of the output light of the acoustooptic modulator to generate a second signal associated with the detected light level. The first signal is compensated for by a compensation circuit in response to the second signal. The compensation circuit has input-to-output characteristics corresponding to linear function which is given by approximating the characteristic of the acoustooptic modulator on the output light relative to the first signal. The compensator compensates for the first signal in accordance with the input-to-output characteristics.

6 Claims, 6 Drawing Figures

LIGHT QUANTITY COMPENSATION APPARATUS

BACKGROUND OF THE INVENTION

1. Field of the Invention

The present invention relates to apparatus for compensating for a quantity of light and, more particularly, to a light amount compensation apparatus applicable to a system which uses a laser beam modulated with information signals for recording information on a photosensitive material.

2. Description of the Prior Art

In an information recording system of the type described above, the recording laser beam has to be stable, and especially stable when image information to be recorded requires relatively high-quality images such as diagnostic images and remote sensing images. The problem encountered in this respect is that the amount of light emitted from a laser fluctuates with the lapse of time and contains noise and, additionally, the performance of the laser per se deteriorates as the time passes by.

Various kinds of photosensitive materials are used according to the properties or applications of the image information to be recorded. The primary requisite is that the amount of exposure to the laser beam be controlled to match with the specific sensitivity (ASA sensitivity) of the photosensitive or radiation-sensitive material used, thereby allowing an optimum portion, or latitude, of the gradation reproduction characteristic curve particular to the photosensitive material.

One approach heretofore proposed for such light quantity compensation is to adjust the optical density of a neutral density (ND) filter which is disposed in the output optical path of the light source, i.e. laser. However, this allows the filter density to be adjusted only in a stepwise manner and not exactly linearly along with fluctuations of the laser characteristics. Another problem inherent in this approach is that the filter has to be replaced manually requiring work which is time- and labor-consuming.

SUMMARY OF THE INVENTION

It is therefore an object of the present invention to provide a light quantity compensation apparatus which eliminates the drawbacks inherent in the prior art apparatus.

It is another object of the present invention to provide a light quantity compensation apparatus which is capable of supplying a recording system with a laser beam in a quantity which is suitable for gradation reproduction characteristics particular to a recording system.

In accordance with the present invention, a light quantity compensation apparatus includes acoustooptic modulator means for modulating incident light in response to a first signal to emit output light, photoelectric converter means for detecting a level of the output light to deliver a second signal corresponding to the detected level, and a compensation circuit for compensating for the first signal in response to the second signal. The compensation circuit has input-to-output characteristics associated with a linear function defined by approximating a characteristic of the acoustooptic modulator means on the output light relative to the first signal, thereby compensating for the first signal based on the input-to-output characteristics.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENT

Figure 1:
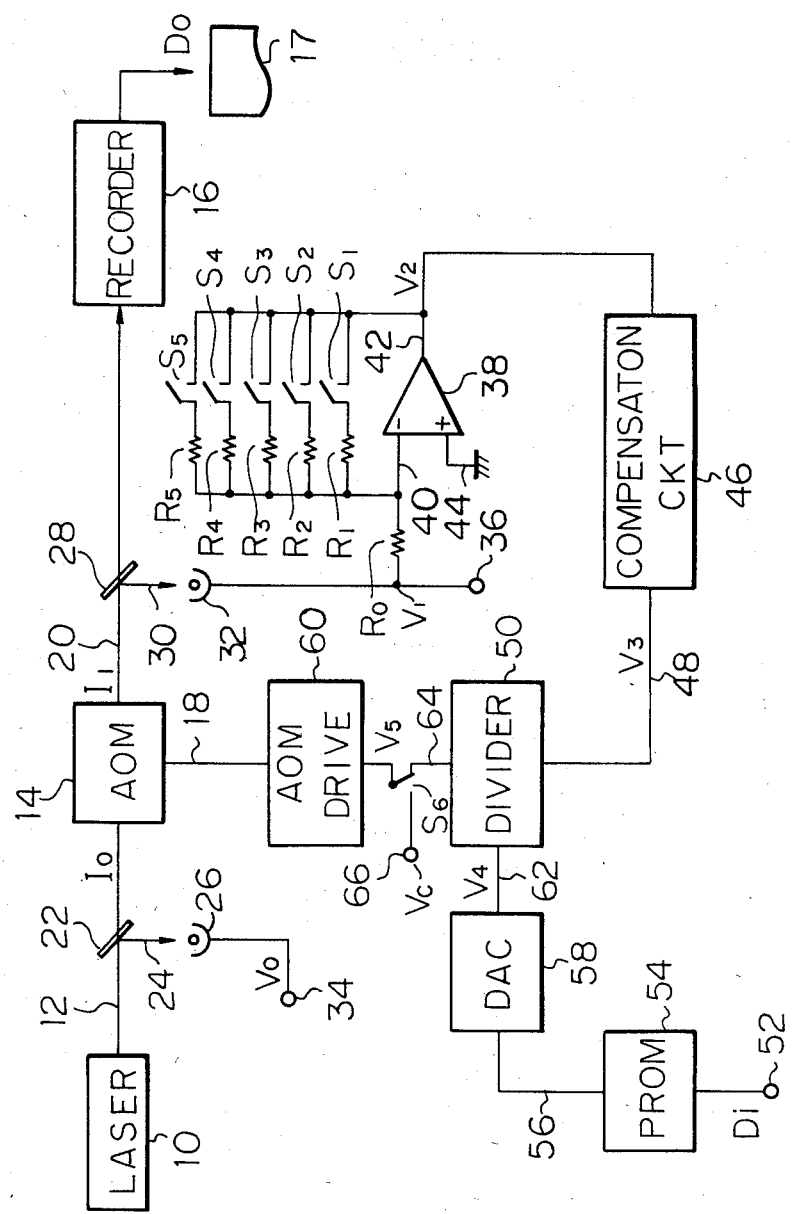
FIG. 1 is a schematic block diagram of a light amount compensation apparatus in accordance with the present invention.

Referring to FIG. 1 of the drawings, an embodiment of apparatus for light quantity compensation in accordance with the present invention is shown. A laser 10 emits a laser beam 12 which is directed to a recording unit 16 by way of an acoustooptic modulator (AOM) 14. The AOM 14 may include a conventional acoustooptic device adapted to control the diffraction of an output beam 20 in response to a supersonic wave which is generated by an input high-frequency signal, which is applied to an input port 18 as illustrated. The primary diffraction beam 20 provided by the modulation of the input beam 12 is directed to the recording unit 16. The recording unit 16 is an information recording apparatus, which uses the modulated beam 20 for recording information on a recording medium 17 such as photosensitive or radiation-sensitive material.

A half-mirror or beam splitter 22 is located in the optical path between the laser 10 and the AOM 14 through which the laser beam 12 propagates. The half-mirror 22 splits the beam 12 into one which is directed to the AOM 14 and the other, 24, which is directed to a photodetector 26. A second half-mirror or beam splitter 28 is disposed also in the optical path between the AOM 14 and the recorder 16. The light beam 30 reflected by the half-mirror 28 is received by a second photodetector 32. Each of the photodetectors 26 and 32 comprises a photoelectric transducer which delivers an electric signal in response to the incident light. The output of the photodetector 26 is connected to a monitor terminal 34, while the output of the photodetector 32 is connected to an inverting input 40 of an operational amplifier (op amp) 38 via a resistor $R_0$, and to a monitor terminal 36.

As shown, the inverting input 40 of the op amp 38 is connected to an output terminal 42 by way of a plurality of serial connections of resistors R and contacts S. In this particular embodiment, five serial connections of resistors $R_1$–$R_5$ and contacts $S_1$–$S_5$ are connected in parallel between the input 40 and the output 42 of the op amp 38. The non-inverting input 44 of the op amp 38 is connected to ground.

The circuit described above constitutes an inverting amplifier circuit, the gain of which, $\alpha = v_2/v_1$ ($<0$), depends on the ratio of the feedback resistance, $R_1$–$R_5$, to the resistance $R_0$. The contacts or switches $S_1$–$S_5$ are selectively closed one at a time to select one of the resistors $R_1$–$R_5$, which connect the input 40 to the output 42. In the illustrative embodiment, compared with the resistor $R_3$, the resistor $R_4$ is higher by 10%, the resistor $R_5$ is higher by 20%, the resistor $R_2$ is lower by 10%, and the resistor $R_1$ is lower by 20%. Therefore, the gain of the system will be increased by 10% when the switch $S_4$ is closed, increased by 20% when the switch S₅ is closed, decreased by 10% when the switch S₂ is closed, and decreased by 20% when the switch S₁ is closed, compared with the condition wherein the contact S₃ is closed.

The output 42 of the op amp 38 is connected to a compensation circuit 46. As will be described in detail, the compensator 46 is an analog operational circuit for altering the voltage appearing at the output 18 of an AOM drive circuit 60, in accordance with a level of the output beam 20 of the AOM 14. The output 48 of the compensator 46 is fed to a divider 50.

Information to be recorded by the recorder 16 is supplied to an information signal input port 52. In this embodiment, the information at the input port 52 is fed as digital data to a programmable read-only memory (PROM) 54. The PROM 54 stores in digital form input voltages to the AOM driver 60 which will allow the recorder 16 to reproduce an ideal rectilinear gradation on the photosensitive material 17 in response to various information signals being fed to the port 52. An input data signal, quantized for example by a 10-bit density scale, accesses a specific storage location in the PROM 54 so that data in the specific location is produced at an output 56 of the PROM 54. The data on the output 56 is converted by a digital-to-analog converter (DAC) 58 into a corresponding analog voltage $v_4$, which is in turn applied to an input 62 of the divider 50.

The divider 50, which is an analog divider, divides the voltage $v_4$ at the input 62 by the voltage $v_3$ at the other input 48 to feed out the quotient to an output 64 thereof. The output 64 is connected to the AOM driver 60 via the break contact of a switch S₆. The other or make contact of the switch S₆ is connected to a test terminal 66.

The AOM driver 60 includes an oscillation circuit for generating a high frequency voltage. In response to the input voltage $v_5$, the AOM driver 60 varies the level of the output high frequency voltage to thereby modulate the intensity of the output beam 20 of the AOM 14.

Figure 2A:
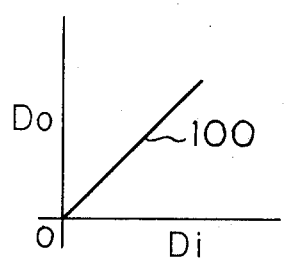
FIGS. 2A–2E are graphs representing various characteristics useful for understanding the operations of the apparatus shown in FIG. 1.

Ideally, the optical density $D_o$ of images to be recorded on the photosensitive material 17 should be a monotonously increasing function relative to a density level $D_i$ of video information supplied to the terminal 52, that is, it should follow a straight line 100 passing through the origin 0 in FIG. 2A.

Figure 2D:
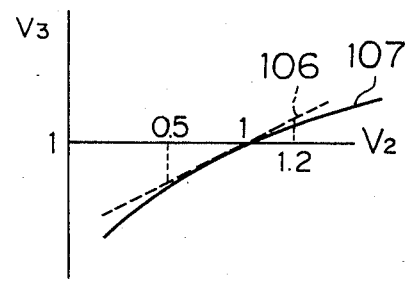
Figure 2B:
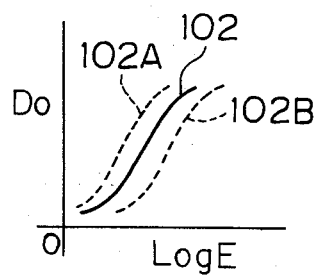

Now, the relationship between the recording density level $D_o$ on the photosensitive material 17 and the quantity of exposure E, or integrated value of the intensity $I_1$ of the beam 20 developed from the AOM 14 with respect to exposure time, is generally represented by a curve 102 shown in FIG. 2B; the generally linear part of the curve 102 is usually utilized for the reproduction of gradation. If the exposure time per pixel for forming a scan line on the sensitive material 17 is constant, the exposure quantity E is proportional to the intensity $I_1$ of the recording beam 20. This is expressed as follows:

$$\log E = K_1 + \log I_1, \quad (1)$$

where $K_1$ is a constant.

As generally accepted, while the intensity $I_1$ of the AOM output beam 20 is controlled by the voltage $v_5$ applied to the AOM driver 60, their relation is generally not linear but $$I_1 \propto \sin^2 K_2 v_5, \quad (2)$$

where $K_2$ is a constant.

Obtaining the logarithm of both sides of expression (2) and then rewriting the sine member by an expansion gives the following relation:

$$\log I_1 \propto \log \sin^2 K_2 v_5 = \quad (3)$$

$$2\log\left(K_2 v_5 - \frac{(K_2 v_5)^3}{3!} + \frac{(K_2 v_5)^5}{5!} - \cdots\right).$$

In this embodiment, expression (3) is approximated by a line expressed by the following relation within the range of $0 \leq k_2 v_5 \leq \frac{1}{3}\cdot\pi$ which insures accuracy necessary for the reproduction of halftone image:

$$\log I_1 = 2\log v_5 + K_3, \quad (4)$$

where $K_3$ is a constant.

It should be noted that the approximation represented by relation (4) is not limited to the range $0 \leq k_2 v_5 \leq \frac{1}{3}\cdot\pi$. A different range of $K_2 v_5$ may be used if the resulting increase or decrease in accuracy can be accommodated.

Figure 2E:
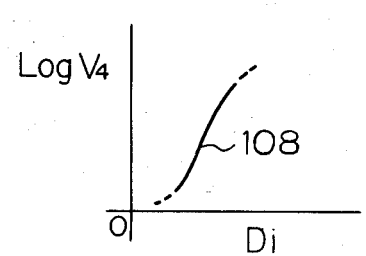
Figure 2C:
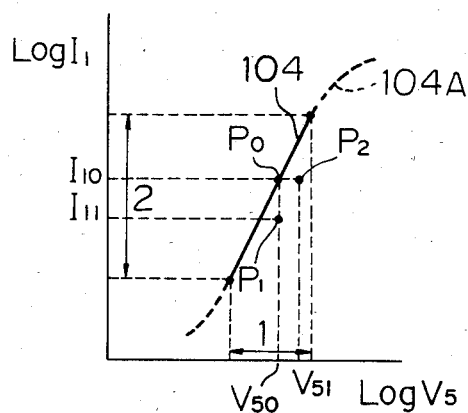

FIG. 2C shows a curve 104A obtained by plotting the relationship between the intensity $I_1$ and the input voltage $v_5$ of expression (2) both in logarithmic scale (ordinate: log $I_1$, abscissa: log $v_5$).

The curve 104A, in this embodiment, is approximated by a line represented by expression (4) within the range of $0 \leq K_2 v_5 \leq \frac{1}{3}\cdot\pi$. The approximated portion of the curve 104A is shown in FIG. 2C and designated by 104. In the case of the approximation given by expression (4), the relation shown below naturally holds:

$$I_1 \propto v_5^2. \quad (5)$$

Suppose that the AOM characteristic is linear and not the one represented by the curve 104A of FIG. 2C. Then, the light quantity may usually be compensated for by supplying the output $v_1$ of the photodetector 32 to the divider 50 to divide the image signal $v_4$ thereby. However, the AOM characteristic is generally non-linear and, indeed, this is true in this embodiment. It follows that the characteristic required of the compensator 46 for the compensation of the non-linear AOM characteristic should be the one expressed by expression (6) or (7) in view of expression (5):

$$v_3 = \sqrt{v_2} \quad (6)$$

or, when the gain of the op amp 38 is unity, then $$v_3 = \sqrt{v_1} \quad (7)$$

The relationship of expression (6) is represented by a curve 107 in the graph shown in FIG. 2D.

In the illustrated embodiment, the fluctuation range of the voltage $v_2$ applied to the compensator 46 is assumed to lie within the range of, for example:

$$0.5 \leq v_2 \leq 1.2 \quad (8)$$

Within this range, the relation between the voltages $v_3$ and $v_2$ in expression (6) is approximated by a dotted line 106. That is, employing constants a and b, the relation may be expressed as:

$$v_3 = av_2 + b \quad (9)$$

In the range shown in relation (8), it will be seen that the error entailed by approximating the curve 107 of FIG. 2D by the line 106 is not more than several percent which is negligible in practice.

As described above, the compensator 46 in accordance with this embodiment has a linear function characteristic expressed by relation (9). The output $v_3$ of the compensator 46 is fed to the divider 50 so that the $-50$ to 20% fluctuations in the amount of laser light can be compensated for with a satisfactory accuracy.

Now, the description will be made concerning the data stored in the PROM 54. Supposing that the signal $v_3$ supplied to the input 48 of the divider 50 is constant, and if the exposure time in the relationship shown in FIG. 2C is constant, then the relationship between the recording optical density $D_o$ and log $v_5$, i.e., between $D_o$ and log $v_4$, is automatically determined. If the input density $D_i$ and output density $D_o$ are proportional to each other as indicated in FIG. 2A, the relationship between the input density $D_i$ and log $v_4$ is induced from the relationship between the output density $D_o$ and log $v_4$. This is represented by a curve 108 in FIG. 2E. The PROM 54 stores the curve 108 therein in the form of digital data. That is, the PROM 54 stores signals $v_4$ in association with input density levels $D_i$, which are adapted to effect the modulation in the AOM 14 such that the relationship between the input and output densities $D_i$ and $D_o$ always take the ideal form as shown in FIG. 2A. With this construction, image information having a density $D_i$ is supplied to the terminal 52 and the density $D_i$ is transformed into a corresponding voltage $v_4$ by the PROM 54 and DAC 58. The voltage $v_4$ ultimately modulates the output beam 20 of the AOM 14 so that image information will be reproduced on the photosensitive material 17 in accordance with the ideal gradation characteristic 100.

Before introduction of the apparatus of the invention into a desired system, conversion data of the nature described above are written into the PROM 54 in the following manner. First, provisional patterns such as standard data are stored in the PROM 54. Then, data indicative of a test pattern are fed to the input terminal 52 to measure a relationship between a drive voltage applied to the AOM 14, or input voltage $v_5$ to the AOM driver 60, and a recording or output density level $D_o$. The voltage $v_5$ and the intensity $I_1$ of the beam 20 are mutually in the relation approximated by the line 104. This, coupled with the fact that the exposure time per a pixel is constant, sets up the correspondence of the measured relation to the curve 102 shown in FIG. 2B. Therefore a curve 108, FIG. 2E, between the input density level $D_i$ and the output $v_4$ of the DAC 58 (or PROM 54) is obtainable from the measured relationship between the input voltage $v_5$ and the output density level $D_o$ and using the lines 100, FIG. 2A, and 104, FIG. 2C. Data will be written into the PROM 54 based on the curve 108.

As previously stated, the compensator 46 in accordance with the present invention is adapted to compensate for any fluctuation in the intensity of the primary diffraction light produced from the AOM 14, i.e., output beam 20, due to noise and fluctuation in the laser 10, changes in the oscillation characteristic with the lapse of time, and like causes.

Stated another way, the input-to-output characteristics of the compensator 46 are so designed as to satisfy expression (9) in order that the relation (4) provided by approximating the input-to-output characteristics of the laser modulator system, which includes the AOM 14 and AOM driver 60, may be maintained by compensating for the fluctuation in the level of the laser beam 20.

While the laser is free from fluctuation in quantity, that is, so long as image information is recorded in the photosensitive material 17 to the ideal gradation characteristic 100, the compensator 46 delivers a signal having a predetermined reference level without compensated components. Regarding the timing for enabling the apparatus of the invention, i.e., laser power check timing, it may be performed during an interval between successive horizontal scans, after the vertical scan of one frame, or before the vertical scan of the next frame.

In response to a decrease in the output power of the laser, the apparatus of the present invention compensates for the decrease in the following manner.

Assume that the AOM 14 is being driven to operate at a point $P_0$ shown in FIG. 2C. That is, the value of the voltage $v_5$ applied to the driver 60 in response to a power checking reference voltage is $v_{50}$; the output of the compensator 46 is kept at a certain constant value. Under the existing output condition of the laser 10, a light beam 20 having a level $I_{10}$ is emitting from the AOM 14. Assume that the laser output has lowered for one reason or another lowering the level of the beam 20 from $I_{10}$ to $I_{11}$. As soon as the power check mode is set up under the above condition, the intensity of the light incident on the photodetector 32 is lowered to shift the operation point of the AOM 14 from $P_0$ to $P_1$. That is, the output characteristic of the compensator 46 conforms to relation (9) and, therefore, the output voltage $v_3$ is linearly lowered in response to a decrease in the input voltage $v_2$. The divider 50 is producing a voltage $v_5$ given by dividing the input voltage $v_4$ from the PROM 54 by the input voltage $v_3$ from the compensator 46. In response to the drop of the voltage $v_3$, the output voltage $v_5$ of the divider 50 is raised from $v_{50}$ to $v_{51}$ tending to bring the operation point closer to $P_2$. This allows the output beam 20 from the AOM 14 to regain the intensity $I_{10}$. After the compensation, the existing output of the compensator 46 is held until the next compensation operation. In this particular embodiment, it will be held in the course of recording of one frame or that of one scan line. Likewise, in response to an increase in the output of the laser 10, the system will be operated such that the output level $I_1$ of the AOM 14 becomes lower.

The level of the output beam 20 of the AOM 14 is controllable by varying the amplification gain $\alpha$ of the amplifier circuit which includes the amplifier 38. This is effected by selectively closing the switches $S_1$–$S_5$. If the switch $S_3$ is closed, for example, the output voltage $v_2$ will be:

$$v_2 = \alpha v_1 = -\frac{R_3}{R_0} \cdot v_1 \tag{10}$$

If the closed switch is $S_5$, then the output voltage $v_2$ will be:

$$v_2 = -\frac{R_5}{R_0} \cdot v_1 \tag{11}$$

Because the resistor $R_5$ has a 20% higher resistance than the resistor $R_3$, the output voltage $v_2$ in expression (11) is 20% higher than that in expression (10).

Referring to FIG. 2B, the photographic characteristic of the photosensitive material 17 represented by the curve 102 will translate leftward to a curve 102A if the ASA sensitivity is high, and rightward to a curve 102B if it is low. Where a high sensitivity material is used, the characteristic curve 102A holds as stated above, so the level $I_1$ of the laser beam 20 has to be lowered. In accordance with this embodiment, the switch $S_4$ or $S_5$ is assigned for such a purpose, If the switch $S_5$ is closed, for example, the amplifier circuit attains a 20% higher gain than usual as previously stated and, hence, the output voltage $v_2$ thereof increases by 20%. This allows the output $v_3$ of the compensator 46 to increase as taught by relation (9) so that the input voltage $v_5$ to the AOM driver 60 is lowered to in turn decrease the output beam level $I_1$ of the AOM 14. In this manner, the photosensitive material 17 is exposed to the beam in a manner to match with the curve 102A. For a material having a low sensitivity as represented by the curve 102B, the switch $S_2$ or $S_1$ is closed to lower the output voltage $v_2$ of the amplifier circuit thereby raising the output level $I_1$ of the AOM 14. While such operations of the switches $S_1$-$S_5$ may be performed manually to suit a specific sensitivity of the photosensitive material 17, an arrangement may be incorporated such that the switches $S_1$-$S_5$ are automatically and selectively closed by identifying a specific sensitivity of the material 17 in terms of a indication code therefor.

The description has focused to the compensation which provides an ideal output or recording density level $D_o$ for an input density level $D_i$ in accordance with the characteristics of a sensitive material used. However, it will be apparent to those skilled in this art that the compensation may be of the nature which increases or decreases the recording density beyond the ideal one as desired.

The embodiment shown in FIG. 1 includes monitor terminals 34 and 36 for monitoring the levels $I_0$ and $I_1$ of the laser beams 12 and 20, respectively. The monitor terminals 34 and 36 are available for a fault shooting test for the laser optical system which extends from the laser 10 to the recorder 16.

For the fault shooting test, the switch or contact $S_6$ is brought into connection with the test terminal 66, from which AOM drive 60 receives a reference voltage $v_c$. Under this condition, the output $v_0$ at the terminal 34 and that $v_1$ at the terminal 36 are measured. Based on these values $v_0$ and $v_1$, there can be obtained the quantity of light $I_0$ upstream of the AOM 14 and that $I_1$ downstream of the same. This allows the decrease in the output beam of the laser 10 itself to be separated from failures in the AOM 14 and its associated elements (e.g. optical mismatching of the AOM 14 and fault in the driver 60). The monitor terminal 34 may be used to measure the voltage $v_0$ to thereby monitor the lasing condition of the laser 10, for the purpose of obtaining data for the maintenance and replacement of the laser 10. If desired, a programmed routine may be employed to periodically and automatically effect the measurement by the contact $S_6$ and terminals 34 and 36.

In summary, it will be seen that the present invention provides a light quantity compensation apparatus which supplies a stable laser beam which will always insure reproduction of an optimum gradation in a image information recording system, while promoting adequate recording of image information matching it with a sensitivity of a photosensitive material.

Various modifications will become possible for those skilled in the art after receiving the teachings of the present disclosure without departing from the scope thereof.

What is claimed is:

1. Apparatus for compensating for a quantity of light, comprising:
   acoustooptic modulator means for modulating light incident thereon in response to a first signal to produce output light;
   photoelectric converter means for detecting a level of said output light to produce a second signal which is associated with said detected level; and
   compensation circuitry for compensating for the first signal in response to the second signal;
   said compensation circuitry having input-to-output characteristics corresponding to a linear function which is defined by approximating a characteristic of the acoustooptic modulator means on the output light relative to the first signal, thereby compensating for the first signal in accordance with said input-to-output characteristics.

2. Apparatus in accordance with claim 1, wherein said compensation circuitry comprises a compensation circuit for producing a third signal associated with the second signal in accordance with the input-to-output characteristics, and a divider circuit for dividing an input signal applied thereto by the third signal to produce the first signal.

3. Apparatus in accordance with claim 1, wherein said compensation circuitry comprises level adjusting means for selectively adjusting a level of the second signal, whereby the intensity of the output light of the acoustooptic modulator means is adjustable in dependence upon a sensitivity of a radiation-sensitive material which is to be exposed to the output light.

4. Apparatus in accordance with claim 3, wherein said level adjusting means includes an operational amplifier circuit having an input port connected to receive the first signal and an output port for developing the second signal therefrom, said operational amplifier circuit including a plurality of resistors interconnected to selectively feed the second signal to the input port, said plurality of resistors being selectable in connection so as to select a total amplifier gain of the operational amplifier circuit in dependence upon a sensitivity of the radiation sensitive material.

5. Apparatus in accordance with claim 1, further comprising a laser for generating the light incident on said acoustooptic modulator means.

6. Apparatus in accordance with claim 3, wherein said compensation circuitry comprises a compensation circuit for producing a third signal associated with the second signal in accordance with the input-to-output characteristics, and a divider circuit for dividing an input signal applied thereto by the third signal to produce the first signal;
   said apparatus further comprising:
   a laser for generating the light incident on said acoustooptic modulator means; and
   recording means operative in response to the output light for recording on the radiation-sensitive material information which is carried in the output light and associated with the input signal.

* * * * *